(12) United States Patent  (10) Patent No.: US 9,259,899 B1
Arbesman  (45) Date of Patent: Feb. 16, 2016

(54) THIN LAYER LAMINATE

(71) Applicant: Ray Arbesman, Toronto (CA)

(72) Inventor: Ray Arbesman, Toronto (CA)

(73) Assignee: R.A. INVESTMENT MANAGEMENT S.A.R.L., Luxembourg (LU)

( * ) Notice: Subject to any disclaimer, the term of this patent is extended or adjusted under 35 U.S.C. 154(b) by 0 days.

(21) Appl. No.: 14/593,105

(22) Filed: Jan. 9, 2015

(51) Int. Cl.
| | |
|---|---|
| B32B 3/06 | (2006.01) |
| B32B 7/08 | (2006.01) |
| B32B 7/00 | (2006.01) |
| B23P 11/00 | (2006.01) |
| B23P 21/00 | (2006.01) |
| B32B 15/08 | (2006.01) |
| B32B 15/18 | (2006.01) |

(52) U.S. Cl.
CPC . *B32B 7/08* (2013.01); *B32B 15/08* (2013.01); *B32B 15/18* (2013.01)

(58) Field of Classification Search
CPC .............. B32B 3/00; B32B 3/30; B32B 3/06; B29C 65/56; B29C 65/64; Y10T 29/49833
USPC ........ 428/99, 98, 223, 119, 120, 172; 29/432, 29/432.1, 716, 717
See application file for complete search history.

(56) References Cited

U.S. PATENT DOCUMENTS

| | | | |
|---|---|---|---|
| 1,897,088 | A | 2/1933 | Victor |
| 1,915,221 | A | 6/1933 | Fitzgerald |
| 2,171,530 | A | 9/1939 | Balfe |
| 2,255,268 | A | 9/1941 | Perrine |
| 3,092,532 | A | 6/1963 | Swick et al. |
| 3,533,891 | A | 10/1970 | Puyear |
| 3,551,232 | A | 12/1970 | Thompson |
| 3,605,360 | A | 9/1971 | Lindal |
| 4,023,613 | A | 5/1977 | Uebayasi et al. |
| 4,234,638 | A | 11/1980 | Yamazoe et al. |
| 4,552,252 | A | 11/1985 | Stahl |
| 4,569,424 | A | 2/1986 | Taylor, Jr. |
| 4,640,390 | A | 2/1987 | Saumweber et al. |
| 4,705,278 | A | 11/1987 | Locacius et al. |
| 4,723,783 | A | 2/1988 | Belter et al. |
| 4,776,602 | A | 10/1988 | Gallo |
| 4,815,172 | A | 3/1989 | Ward |
| 4,911,972 | A | 3/1990 | Mercuri |
| 4,939,818 | A | 7/1990 | Hahn |
| 5,067,210 | A | 11/1991 | Keyaki |
| 5,142,743 | A | 9/1992 | Hahn |

(Continued)

FOREIGN PATENT DOCUMENTS

| | | |
|---|---|---|
| CA | 1330521 C | 10/1988 |
| CA | 1337622 C | 3/1989 |

(Continued)

OTHER PUBLICATIONS

U.S. Appl. No. 14/532,739, filed Nov. 4, 2014 entitled "Precursor Laminate and Method for Forming a Laminate".

(Continued)

*Primary Examiner* — Catherine A Simone

(74) *Attorney, Agent, or Firm* — Patterson & Sheridan, L.L.P.

(57) ABSTRACT

The present invention is a method of making laminated material comprising the steps of providing a base lamina with pointed tipped piercing members, impaling successive layers of thin laminae thereon using a resilient pad, clinching the protruding tips down onto the top lamina with a hard pad.

28 Claims, 1 Drawing Sheet

(56) References Cited

U.S. PATENT DOCUMENTS

| | | |
|---|---|---|
| 5,143,184 A | 9/1992 | Snyder et al. |
| 5,172,920 A | 12/1992 | Schlenk |
| 5,362,074 A | 11/1994 | Gallo et al. |
| 5,376,410 A | 12/1994 | MacKelvie |
| 5,469,604 A | 11/1995 | Calmettes et al. |
| D374,609 S | 10/1996 | Akeno |
| D376,533 S | 12/1996 | Akeno |
| 5,611,122 A | 3/1997 | Torigoe et al. |
| 5,788,247 A | 8/1998 | Tensor |
| D400,427 S | 11/1998 | Okawa et al. |
| 5,842,546 A | 12/1998 | Biswas |
| D425,405 S | 5/2000 | Naohara et al. |
| 6,247,704 B1 | 6/2001 | Battistoni |
| 6,258,457 B1 | 7/2001 | Ottinger et al. |
| 6,276,045 B1 | 8/2001 | Buchi et al. |
| 6,279,222 B1 | 8/2001 | Bunker et al. |
| 6,431,331 B1 | 8/2002 | Arbesman |
| 6,464,047 B1 | 10/2002 | Arbesman |
| 6,622,346 B2 | 9/2003 | Graham et al. |
| 6,671,935 B2 | 1/2004 | Filion et al. |
| 6,843,095 B2 | 1/2005 | Arbesman |
| 6,860,368 B2 | 3/2005 | Kulis, Jr. et al. |
| 6,910,255 B2 | 6/2005 | Arbesman |
| 6,913,673 B2 | 7/2005 | Baggot et al. |
| 7,048,097 B2 | 5/2006 | Arbesman |
| 7,222,701 B2 | 5/2007 | Pham |
| 7,320,386 B2 | 1/2008 | Kulis, Jr. et al. |
| 7,686,142 B2 | 3/2010 | Jung |
| 7,841,052 B2 | 11/2010 | Ducauchuis |
| 7,989,049 B2 | 8/2011 | Potier |
| 8,048,507 B2 | 11/2011 | Townsend et al. |
| 8,088,316 B2 | 1/2012 | Muth et al. |
| D654,355 S | 2/2012 | Cheng |
| 8,407,864 B2 | 4/2013 | Mask et al. |
| 8,683,840 B2 | 4/2014 | Tuma et al. |
| 8,685,520 B2 * | 4/2014 | Meyer et al. ............... 428/99 |
| 2002/0170789 A1 | 11/2002 | Poelemans |
| 2004/0016608 A1 | 1/2004 | Gutowski |
| 2004/0140165 A1 | 7/2004 | Pham |
| 2005/0170157 A1 | 8/2005 | Armela et al. |
| 2006/0027427 A1 | 2/2006 | Anda et al. |
| 2006/0093802 A1 * | 5/2006 | Tsai et al. ............... 428/216 |
| 2006/0246256 A1 | 11/2006 | Ausen et al. |
| 2008/0003401 A1 * | 1/2008 | Barnes et al. ............... 428/99 |
| 2010/0170758 A1 | 7/2010 | Chen |
| 2010/0207334 A1 | 8/2010 | Virgin et al. |
| 2010/0247869 A1 * | 9/2010 | Meyer et al. ............... 428/172 |
| 2011/0051724 A1 | 3/2011 | Scott et al. |
| 2011/0079065 A1 | 4/2011 | Cabanski et al. |
| 2011/0233875 A1 | 9/2011 | Shaver et al. |
| 2011/0260371 A1 | 10/2011 | Arora et al. |
| 2012/0003462 A1 | 1/2012 | Wong |
| 2012/0006959 A1 | 1/2012 | Braun et al. |
| 2013/0152654 A1 | 6/2013 | Arbesman et al. |
| 2015/0053517 A1 | 2/2015 | Arbesman et al. |
| 2015/0086750 A1 | 3/2015 | Arbesman et al. |
| 2015/0099093 A1 | 4/2015 | Arbesman et al. |

FOREIGN PATENT DOCUMENTS

| | | | |
|---|---|---|---|
| CA | 2127339 A1 | | 7/1994 |
| CA | 2272115 A1 | | 11/1999 |
| CA | 2391183 A1 | | 12/2003 |
| CA | 2778455 A1 | | 11/2013 |
| CA | 2780397 A1 | | 12/2013 |
| CA | 2798303 A1 | | 6/2014 |
| DE | 19754740 A1 | | 3/1999 |
| DE | 102004048464 A1 | | 4/2006 |
| DE | 102006015100 A1 | | 10/2007 |
| DE | 102006015145 A1 | | 10/2007 |
| DE | 102006015148 A1 | | 10/2007 |
| EP | 0859163 A1 | | 8/1998 |
| EP | 934820 A2 | | 8/1999 |
| GB | 2125126 A | | 2/1984 |
| GB | 2507128 A | * | 4/2014 |
| WO | 2011051724 A2 | | 5/2011 |
| WO | 2013177667 A1 | | 12/2013 |
| WO | 2015010183 A1 | | 1/2015 |

OTHER PUBLICATIONS

U.S. Appl. No. 14/533,218, filed Nov. 5, 2014 entitled "Wood-Steel Composite Structure".
Tanged Metal Reinforced Graphite Gasket datasheet, Ningbo Sunwell Fluid Technologies Co. Ltd. 2010.
Tanged Graphite datasheet, Alba Gaskets.
Graphite Sheet with Tanged Metal datasheet, Cixi Cazseal Packing & Gasket Co., Ltd.
Supagraf Expanded Graphite Jointings datasheet, James Walker & Co.
SLT-20 Tang Sheet Specifications datasheet, Dynoteq Kft.
Tanged Stainless Steel Reinforced Graphite Sheet datasheet, Gee Graphite.
Specification Sheet, SPG7003, SPG Gaskets Co.
Graphite Sheet Gaskets, Environmental Gasket Company Ltd.

* cited by examiner

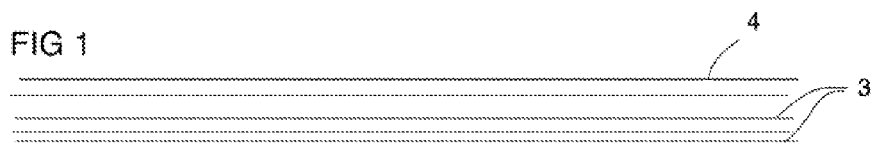
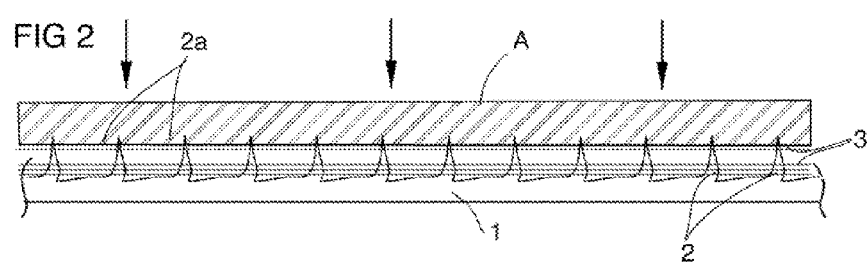
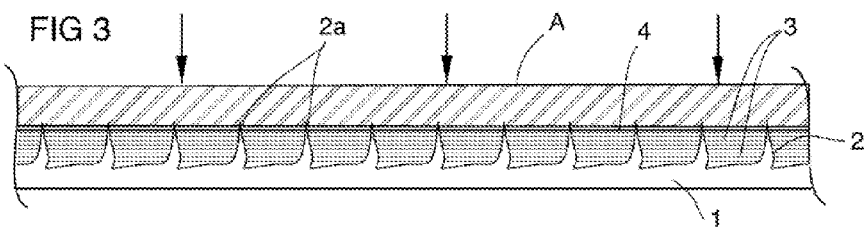
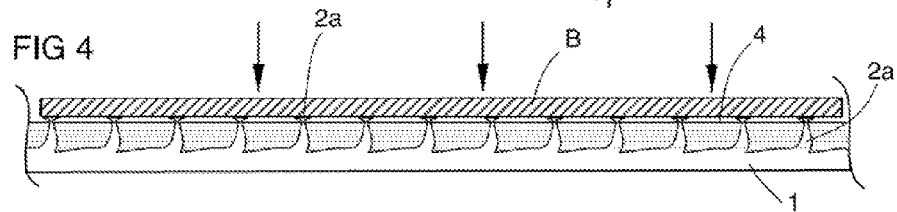
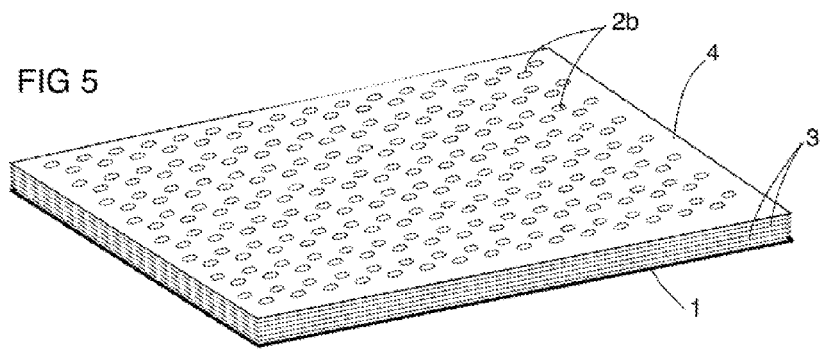

THIN LAYER LAMINATE

FIELD OF THE INVENTION

The present invention relates generally to laminated materials, and more particularly relates to processes for laminating by layering of laminae to produce an improved structural material.

BACKGROUND OF THE INVENTION

There is a growing need for lighter, stiffer, less expensive structural materials, preferably with all three qualities, with which to make better products.

Laminates are generally made from thin laminae and adhesive. The layers with adhesive between them are clamped and held in a heated press until the adhesive cures. Adhesives are generally expensive, toxic and messy. For many purposes and reasons, it would often be very desirable to be able to make laminates without using adhesive.

SUMMARY OF THE INVENTION

The present invention provides a laminate (laminated material) having a base and multiple laminae. The base is formed from a ductile material and has a substantially flat surface with piercing members extending from it. The piercing members extend substantially perpendicularly from the substantially flat surface and, initially, have pointed distal ends and substantially similar heights. The height of a piercing member is the perpendicular distance of the distal end of piercing member from the substantially flat surface. Each lamina is a sheet of material that is pierceable by the piercing members. The sum of the thicknesses of the laminae is less than the height of the barbs. Each lamina is pressed down towards the base so that the piercing members pierce the lamina with a portion of each piercing member extending above the lamina. The tips of the piercing members are then clinched to clamp the laminae together.

The sum of the thicknesses of the laminae may be less than 95% of the height of the barbs. The sum of the thicknesses of the laminae may less than 85% of the height of the barbs and also greater than 50% of the height of the barbs. The sum of the thicknesses of the laminae may less than 85% of the height of the barbs and also greater than 60% of the height of the barbs.

The base is preferably formed from metal, which is preferably steel.

The laminae may be plastic.

The laminae may each have substantially the same thickness.

The laminate may include at least three laminae, and may include five or more laminae.

The clinching of the piercing members is preferably done so that a nail head like end is formed on multiple (preferably substantially all of the) piercing members such that the clinched end contacts the upper surface of one of the laminae.

One lamina, which is the last lamina pressed down onto the base, may be thicker or stiffer than the other laminae.

Adhesive may be applied between at least one pair of laminae, or may be applied between each one pair of laminae and between the base and an adjacent lamina. The adhesive may be hot melt adhesive so that the laminate may be shaped and held in a position until the adhesive cures or cools, and the laminate can later be reheated and reshaped.

The invention also provides a method for forming a laminate from a base and multiple laminae. The base is formed from a ductile material and has a substantially flat surface with piercing members extending from it. Each piercing member extends substantially perpendicularly from the substantially flat surface and has a pointed distal end. The piercing members have substantially similar heights. Each lamina is a sheet of material pierceable by the piercing members. The sum of the thicknesses of the laminae is less than the height of the barbs. For each lamina, in this method, the lamina is first positioned above the piercing members with the lamina substantially parallel to the substantially flat surface of the base. Then the lamina is pressed towards the base so that the piercing members pierce the lamina, with a portion of each piercing member extending above the lamina. After all the laminae are pressed onto the barbs, then the tips of the piercing members are clinched to clamp the laminae together.

BRIEF DESCRIPTION OF THE DRAWINGS

FIG. 1 is a side view depicting five thin, separate laminae, including a top lamina of a different type from the others.

FIG. 2 is a side cross-sectional view of a laminate being assembled where the laminae are impaled successively, layer by layer, onto the piercing members of the base layer using an elastomeric pad or plate that is also partially pierced.

FIG. 3 is a partial side cross-sectional view of the partial laminate shown in FIG. 2 after additional laminae have been added. The top lamina and the stack below are compacted by the same elastomeric pad, leaving the pointed tips of the piercing members protruding through the top lamina.

FIG. 4 is a partial side cross-sectional view of the laminate of FIG. 3, where the protruding tips of the piercing members are being clinched down onto the top lamina by a descending plate, riveting the stack of laminae to the base layer.

FIG. 5 is a perspective view of the laminate sheet of FIG. 4 showing the base layer at the bottom and the stack of laminae above, all of the laminae having been riveted to the base layer by the clinched down tips of the piercing members.

DETAILED DESCRIPTION

In FIG. 1 the laminae 3, 4 are shown as individual and separate thin sheets of pierceable material, such as paper, plastic, composite material or metal, and the textured base 1 with barbs that act as piercing members 2 (which are be referred to herein as "piercing members" or "barbs").

As used herein, "barb" and "piercing member" describe any type of nail-like or pin-like structure, or hooked structure, raised from the surface of a material by carving, gouging, planing or scraping its surface, such as is described in Canadian patent numbers 1,330,521, 1,337,622, and 2,127,339 and in Canadian patent application number 2,778,455, all of which are hereby incorporated herein by reference. The use of such textured materials to form laminates is described in Canadian patent application numbers 2,778,455, 2,821,897 and 2,855,378, and U.S. patent application Ser. Nos. 14/532,739 and 14/533,218, all of which are hereby incorporated herein by reference.

Materials that would normally be too hard or too friable to be so pierced can be used as laminae. For example, hard plastics such as polyvinyl chloride (PVC) (e.g., white drain pipe, 3.2 mm (0.125") thick wall), polycarbonate, high-density polyethylene (HDPE), polypropylene, nylon, are all too hard when "thick" but are is easily pierced when, say, 0.25 mm (0.010") or less in thickness. While coarse sandpaper, for example, would generally not be a suitable material, fine sandpaper may be. Hardwood would generally not be suitable, but veneer may be. For friable mica, thermoset resins or polymers (e.g., epoxy) may be suitable because the sheet is driven down onto the multiple piercing members in planar form, and not creased or bent.

Piercing members 2 are generally pointed structures, which are relatively sharp, and which can be added to ductile materials by, for example, using blades with multiple teeth that are made to travel from opposite directions whereby the teeth gouge (or cut or plane or impact) a flat face of the ductile material forming the base 1, cutting to a shallow depth and for a short distance. In this way a short, shallow (non-piercing) tapered groove is ploughed, resulting in an un-severed projection (a piercing member 2) being raised at the end of each groove. Such piercing members are generally formed on a flat face of a base workpiece, such as on one side of a sheet of steel (although may be formed on both sides or faces). For the purposes of the present invention, it is preferred that the piercing members 2 be formed so that they are relatively straight and extend generally perpendicularly from the flat face of the workpiece as shown in the figures. It is preferred that they not be substantially curved or hook shaped so that they can most readily pierce and extend through each lamina as it is pressed onto the piercing members.

The ductile material forming the textured base 1 is preferably made wholly, or at least partly, of steel, although other metals, and even some plastics may be employed in some embodiments.

The thickness of the base 1 and the size and lengths of the piercing members 2 may vary over a wide range. The length of the piercing members depends primarily on the desired thickness of the laminate to be formed. If the thickness of the base is Tb, and the desired thickness of the laminate is Tl, then typically the piercing members will be selected to be about 1.25*(Tl–Tb). The extra 0.25 factor (which may vary for example between 0.05 and 0.5) is to allow for the tips of the piercing members to be clinched, as described below. The laminae are selected to be "thin", meaning that, for a given piercing member height, at least two laminae can used in the laminate (so each is, for example, less than about 40% of the piercing member height). Preferably at least three laminae are used, and as many as ten or more laminae may be used. If there are Nl laminae of similar thickness (Nl being an integer greater than or equal to 2), then the thickness of each lamina will typically be about (0.8*Hpm)/Nl, where Hpm is the piercing member height above the upper face of the base 1. The factor of 0.8 may vary, for example from 0.5 to 0.95 or more, but is always strictly less than 1.0. As an example, a laminate may be formed from a base having piercing members about 2.5 mm high using 8 layers of laminae, each lamina being about 0.25 mm thick. If the laminae vary in thickness, then generally the sum of the thickness of the laminae is about 80% of the piercing member height (0.8*Hpm). It is also preferred that the sum of the thickness of the laminae is greater than 50% of the height of the piercing members, preferably more than 60% or 70%, and more preferably is about 80%.

The laminae being thin allows the pointed tips 2a of the piercing members 2 to rupture through each lamina, even if it is of a material that would normally be too hard to pierce. It is believed that the highly localized pressure point causes deforms the immediate area past the material's elastic limit leading to rupture.

Applying the lamina layers successively, as per the instant invention, preserves the sharp point of the tips and hence preserves their ability to pierce numerous layers without damage. Too thick a lamina of hard material, for example one of fibreglass, may bend the sharp and necessarily weak tips of the piercing members, leaving them blunt and insufficiently capable of piercing so that additional laminae cannot readily be attached. Therefore the thickness of the laminae is also selected based on the type of material they are made of so that they are penetrable by the piercing members of the base 1 without significant bending of the piercing members.

To apply the laminae, an elastomeric pad A (FIGS. 2 and 3) is used. The elastomeric pad A is designed so that it is easily pierced as it moves each lamina 3 down onto the base layer 1 (as in FIG. 2). Elastomers such as rubber or urethane in a solid or foamed condition may be used.

Laminae 3 are added one or a few at a time to the base layer 1 until the stack is of the desired height (such as 80% of the piercing member height), with the tips 2a of the piercing members 2 protruding above the top lamina layer 4.

Next, a hard (barb-impenetrable) plate B (FIG. 4) is used to clinch or rivet the tip 2a of the each piercing member 2, leaving a head 2b, like a rivet or nail head, by pressing down with substantial force against the top lamina 4, clamping the stack of laminae together. The pointed ends 2a of the piercing members 2 are thereby deformed to form nail-like heads that are extended in the horizontal direction (i.e. parallel to the face of the base). Preferably sufficient pressure is applied by the plate so that the clinched heads of the deformed piercing members are deformed sufficiently so that they contact the upper surface of the top lamina 4 (as shown in FIG. 4) to help lock the laminae together. Preferably most or substantially all or all of the piercing members are clinched, but in all cases a plurality of the piercing members are clinched so that they have nail head like ends.

The top lamina 4 may advantageously be of a thicker or stiffer material than the other laminae 3, or, it may have a hardenable coating applied to add stiffness. A top lamina 4 so enhanced ensures that the heads 2a of piercing member 2 have a secure surface to bed onto, adding strength to the laminate.

While no adhesive is required, it may nevertheless be used in the laminate. For example, laminae of hot-melt thermoplastic adhesive in sheet form can be interspersed in the stack of laminae. Thermoset adhesives may also be used. Such an adhesive-augmented laminate may need to be heated or heat-pressed to harden. For example, a stack of waxed paper laminae will fuse together with low heat whereas epoxy resin might require higher heat, and phenolic resin might be best cured with heat and pressure.

Alternating or otherwise varying laminae of different materials can be used as required to provide laminates that are light, stiff, and/or resistance to mechanical and environmental forces or conditions.

In some embodiments, an adhesive or adhesive film may be placed between laminae. After clinching the laminate together, as described above, the clinched laminate may then be formed/shaped as desired and clamped or held in position until the adhesive cures/cools. When hot melt adhesive is employed, one or more sections of the shaped laminate can later be reheated and reshaped as many times as desired. This can avoid complex moulding.

Note that herein it is generally assumed that the base is aligned horizontally with the piercing members point upwards so that the laminae are pressed "down" onto the piercing members. There is of course nothing special about the orientation, and the use of terms such as "top", "down" and "above" should be interpreted relative to the orientation of the flat face of the base from which the piercing members extend.

The abbreviation mm as used herein refers to millimeters (or in the US, "millimeters").

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

The invention claimed is:

1. A laminate comprising:
   (a) a base formed from a ductile material, the base having a surface with piercing members extending therefrom, the piercing members each having a clinched tip; and
   (b) a plurality of laminae, each lamina pierced through by the piercing members and clamped together by the clinched tips, each lamina having a thickness of at most about 0.25 mm;
   wherein one of the laminae is closest to the clinched tips of the piercing members, and the one of the laminae is at least one of thicker and stiffer than any of the other laminae.

2. The laminate of claim 1, wherein the piercing members have a height measured between the surface and the clinched tip, and a sum of the thicknesses of the laminae is less than 95% of the height of the piercing members.

3. The laminate of claim 1, wherein the piercing members have a height measured between the surface and the clinched tip, and a sum of the thicknesses of the laminae is less than 85% of the height of the piercing members and greater than 50% of the height of the piercing members.

4. The laminate of claim 1, wherein the piercing members have a height measured between the surface and the clinched tip, and a sum of the thicknesses of the laminae is less than 85% of the height of the piercing members and greater than 60% of the height of the piercing members.

5. The laminate of claim 1, wherein the base is formed from metal.

6. The laminate of claim 5, wherein the base is formed from steel.

7. The laminate of claim 1, wherein the laminae are plastic.

8. The laminate of claim 1, wherein the laminate comprises at least three laminae.

9. The laminate of claim 1, wherein the laminate comprises at least five laminae.

10. The laminate of claim 1, wherein adhesive is applied between at least one pair of laminae.

11. The laminate of claim 10, wherein the adhesive is applied between each pair of laminae and between the base and an adjacent lamina.

12. The laminate of claim 11, wherein the adhesive is hot melt adhesive so that the laminate may be shaped and held in a position until the adhesive cures or cools, and the laminate can later be reheated and reshaped.

13. The laminate of claim 1, wherein the laminae comprise a hard material.

14. The laminate of claim 1, wherein the piercing members extend perpendicularly from the surface.

15. The laminate of claim 1, wherein the one of the lamina is thicker than the other lamina.

16. The laminate of claim 1, wherein the one of the lamina is stiffer than the other lamina.

17. The laminate of claim 1, wherein the one of the lamina is thicker and stiffer than the other lamina.

18. A method for forming a laminate, the method comprising the steps of:
   (a) providing a base formed from a ductile material, the base having a surface with piercing members extending therefrom, each piercing member having a pointed tip;
   (b) providing a plurality of laminae, each lamina being a sheet of material pierceable by the piercing members and having a thickness of at most 0.25 mm;
   (c) for each lamina, positioning the lamina proximate the piercing members, and then pressing the lamina towards the base so that the piercing members pierce through the lamina with the tip of each piercing member extending proud of the lamina, wherein one of the lamina is a last lamina pressed towards the base, and the last lamina is thicker or stiffer than the other laminae; and
   (d) clinching the tips of the piercing members to clamp the laminae together.

19. The method of claim 18, wherein the piercing members have a height measured between the surface and the clinched tip, and a sum of the thicknesses of the laminae is less than 95% of the height of the piercing members.

20. The method of claim 18, wherein the piercing members have a height measured between the surface and the clinched tip, and a sum of the thicknesses of the laminae is less than 85% of the height of the piercing members and greater than 50% of the height of the piercing members.

21. The method of claim 18, wherein the piercing members have a height measured between the surface and the clinched tip, and a sum of the thicknesses of the laminae is less than 85% of the height of the piercing members and greater than 60% of the height of the piercing members.

22. The method of claim 18, wherein the base is formed from metal.

23. The method of claim 22, wherein the base is formed from steel.

24. The method of claim 18, wherein the laminae are plastic.

25. The method of claim 18, wherein step d) comprises forming a nail head like end on a plurality of the piercing members such that the clinched tip contacts the last laminae.

26. The method of claim 25, wherein step d) comprises forming a nail head like end on most of the piercing members such that the clinched tip contacts the last laminae.

27. The method of claim 18, further comprising applying adhesive between at least one pair of the laminae.

28. The method of claim 18, wherein step c) comprises pressing an elastomeric pad down on the lamina so that the piercing members pierce through the lamina and also pierce the elastomeric pad.

\* \* \* \* \*